Nov. 13, 1956 R. E. BROCHETTI 2,770,321
AIR FILTERING APPARATUS
Filed June 24, 1954 4 Sheets-Sheet 4

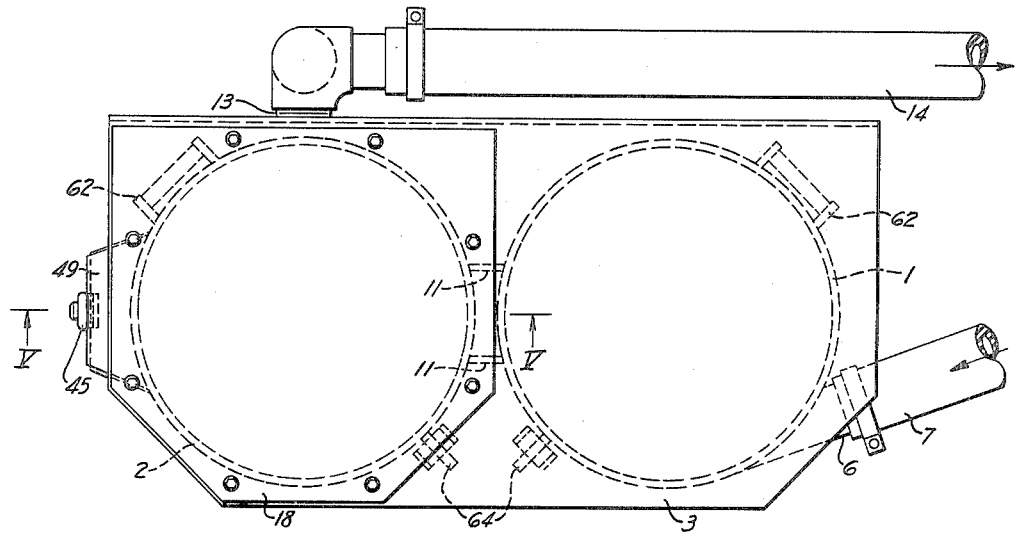

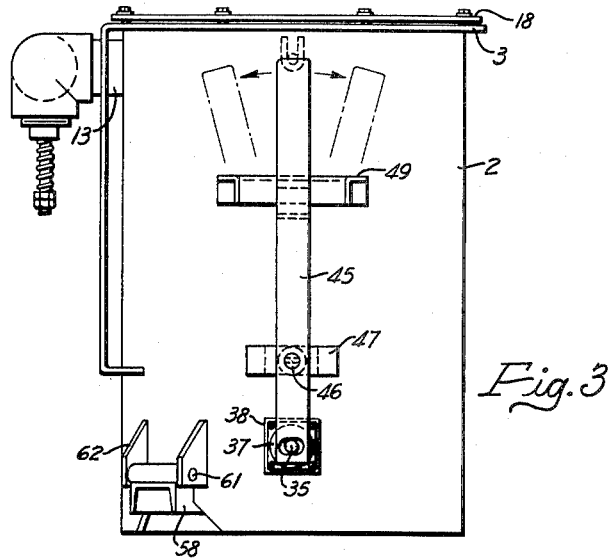
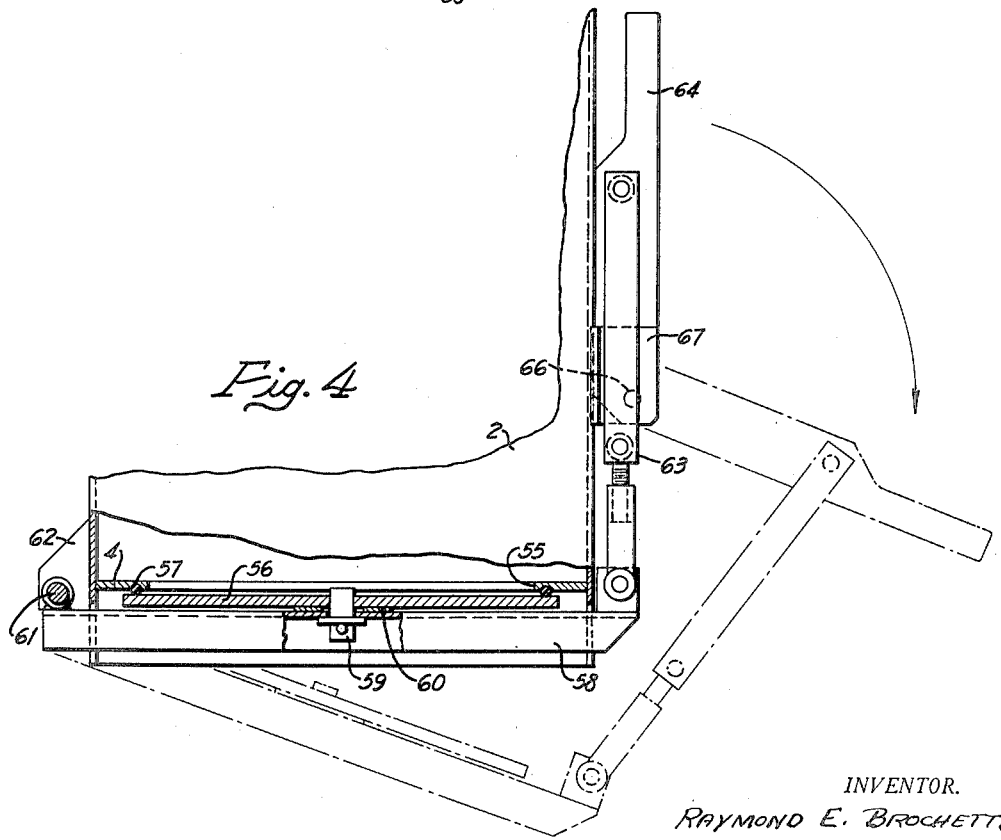

INVENTOR.
RAYMOND E. BROCHETTI
BY
Brown, Critchlow, Flick & Peckham
HIS ATTORNEYS United States Patent Office 2,770,321
Patented Nov. 13, 1956

2,770,321

AIR FILTERING APPARATUS

Raymond E. Brochetti, Churchill, Pa., assignor to Mine Safety Appliances Company, Pittsburgh, Pa., a corporation of Pennsylvania Application June 24, 1954, Serial No. 438,953

15 Claims. (Cl. 183—58)

The invention relates to air filtering apparatus, and more particularly to apparatus utilizing a filtering bag and means for shaking.

It is among the objects of this invention to provide air filtering apparatus which has a large filtering area, which has a filter element that can be shaken effectively to remove the dust that it collects, which is easy to clean out, which includes a filter unit that can be quickly assembled or taken apart, and in which the filter unit can be inserted or replaced easily.

In accordance with this invention, a plurality of spaced concentric rings are disposed in a horizontal plane in the upper part of an upright drum. Also inside of the drum is a downwardly tapered filtering bag which has its larger end encircling the rings and fastened to the drum in sealing engagement therewith. The bag is telescoped up and down within itself between upper and lower folds to provide concentric filtering walls hanging down around and between the rings and supported by them. These walls are prevented from being drawn together by spacing members which engage the inner surface of the bag between the walls. Supported by the drum above the rings is a cross rod, from which the rings are suspended, preferably by a line of clips. The lower part of the drum is provided with an air inlet and the upper part has an air outlet. An arm extends from below the filter unit out through the side of the drum, and means are provided for swinging the outer end to cause a member on its inner end to shake the filter element. The incoming air preferably passes through another drum, in which large dust particles are separated by centrifugal force and gravity, before it reaches the inlet of the one just described. The two drums are connected together in a novel way to provide an air passage between them. The bottoms of the drums can be opened to dump out the dust that has accumulated in them.

Figure 5:
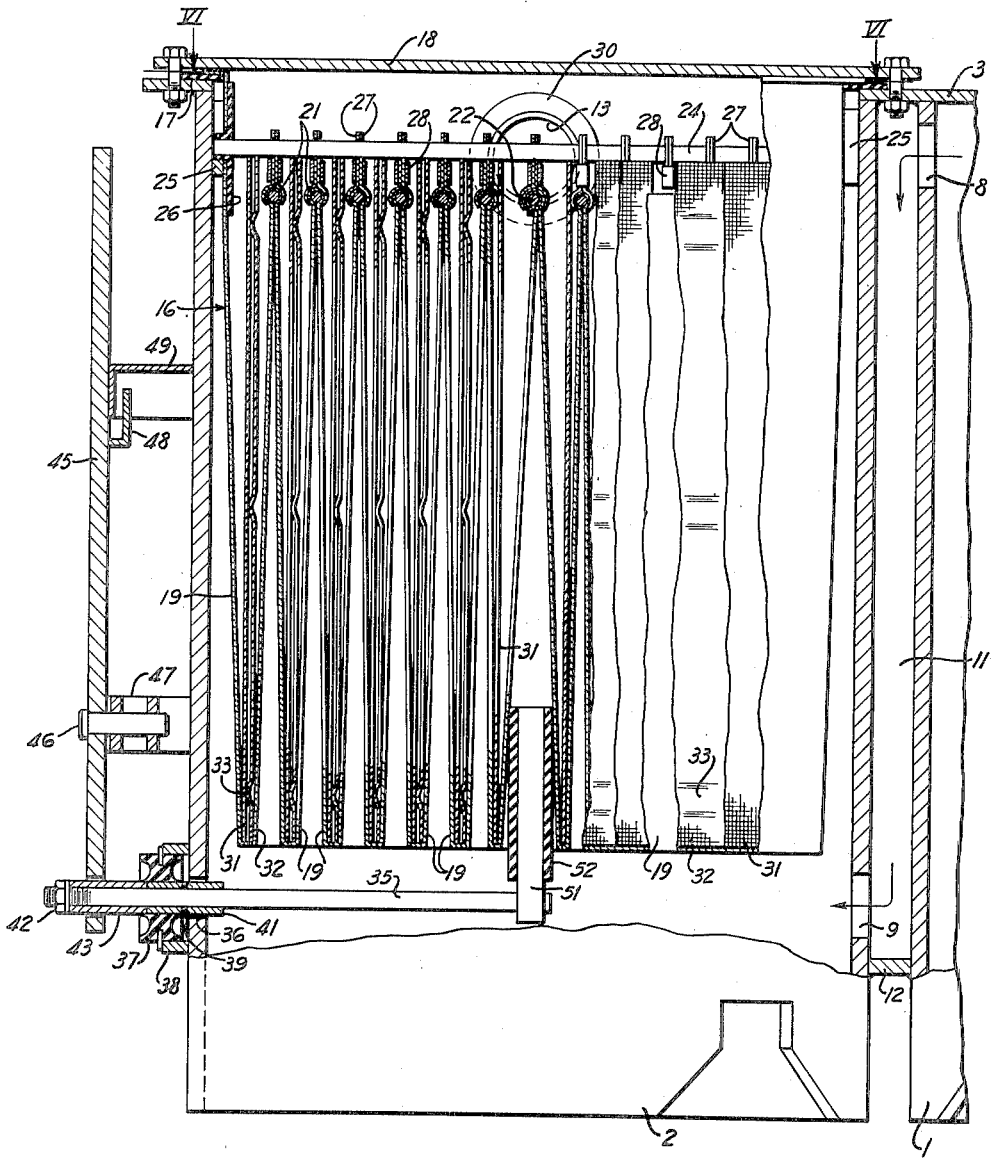

The preferred embodiment of the invention is illustrated in the accompanying drawings, in which Fig. 1 is a plan view of my filtering apparatus;
Fig. 2 is a front view;
Fig. 3 is an end view;
Fig. 4 is an enlarged fragmentary view of the lower part of the filtering drum, with part of it as shown in section;
Fig. 5 is an enlarged vertical section taken on the view V—V of Fig. 1; and
Fig. 6 is an enlarged plan view of the filter unit.

Referring to the drawings, a gravity separation drum 1 and a filtering drum 2 are secured side by side to the bottom of a cover plate 3 that also extends down the back of the drums. The lower edge of the plate likewise is secured to the drums. The vertical portion of the plate may be connected to the side of a suitable support to hold the bottoms of the drums several inches above the ground. The drums are cylindrical and, as shown in Fig. 4 have their bottom walls 4 located a few inches above the bottom of the side walls. The gravity separation drum has an opening in its side walls, which is connected to an inlet pipe 6 that is disposed substantially tangentially of the drum. This pipe is connected to a hose 7, through which the air to be cleaned is delivered to the drum. Such air may contain quantities of rock dust produced when bolt holes are drilled up into the roof of a mine passage. As shown in Fig. 5, the side of the drum closest to the other drum is provided near its top with an air outlet 8, while below that outlet the filtering drum is provided near its bottom with an inlet 9. To connect these two openings, a vertical passage is formed between them by welding vertical parallel plates 11 to the two drums on opposite sides of the openings. The top of the passage is closed by cover plate 3, and the bottom of the passage is closed by a small horizontal plate 12. The back of the filtering drum has an opening near its top, in which a short pipe 13 is mounted that extends a short distance into the drum. Connected with the outer end of this pipe is a hose 14 that leads to suction apparatus (not shown), by which dust laden air is drawn through the two drums.

Figure 6:
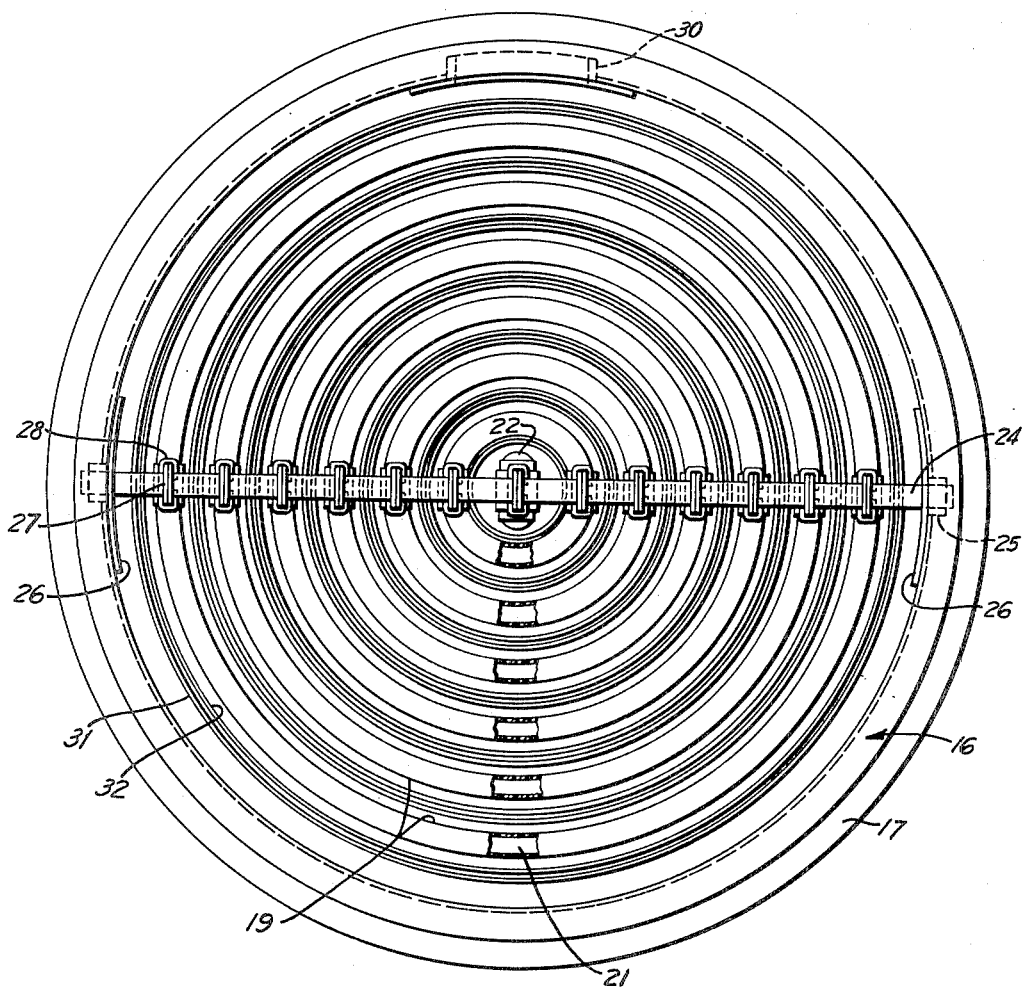

Referring now to Figs. 5 and 6, the filtering element in the filtering drum 2 is formed from a long tapered bag 16 of suitable filtering material. The upper or larger end of the bag extends up out of the drum through a circular opening cut in the cover plate. The top of the bag is secured to a circular gasket 17 that overlies the cover plate, to which the gasket is clamped by means of a removable cover 18 that normally is bolted down to the cover plate around the drum. The bag is telescoped up and down within itself so that concentric filtering walls 19 are formed between upper and lower folds of the bag. These walls are supported by their upper folds, which hang over spaced concentric rings 21 disposed in a horizontal plane near the top of the drum. The smaller end of the bag is folded over a pin 22 at the same level as the rings and is fastened to it in a way that will be described next. The concentric walls of filtering material, therefore hang down around and between the rings, and the lower folds are near the level of the inlet to the filtering drum.

The rings and pin 22 are supported by a line of clips suspended from a rod 24 which extends across the upper part of the drum. The ends of the rod extend through holes in opposite sides of the outer wall of the bag and are supported by U-shaped brackets 25 welded to the inside of the drum. The spaces between the rod and the bag are sealed by rubber grommets 26 that encircle the rod tightly and are sealed against the bag. Each of the clips preferably consist of two metal strips 27 and a sleeve 28. The two strips are placed face to face and have aligned openings through their upper ends which receive the cross rod loosely. The lower ends of the strips have outwardly bowed portions that extend most of the way around the underlying ring and the upper fold of filtering material covering it. The strips are held against the filtering material by the sleeve 28 which extends around them beneath the rod. This sleeve is slipped down over the strips before the rod is passed through them. The clips thus clamp the bag to the rings and pins 22 and support them.

Halfway between the two grommets 26 there is a similar grommet 30 mounted in the side of the bag and provided with a large opening that receives the inner end of outlet pipe 13. Consequently, dust laden air entering the bottom of drum 2 through inlet 9 flows upward and through the filtering walls 19 and then is drawn out through the outlet pipe and hose 14. The dust stopped by the filter is collected on the outer surface of the bag and can fall down into the bottom of the drum if the bag is shaken.

To keep the filtering walls 19 between the rings from being drawn together by the suction above the filter unit, spacing members are placed between them. These are perforated cylinders 31 and 32 that are supported by the lower folds of the bag. The cylinders may be made of wire mesh and they are used in pairs in order to secure the desired spacing, the cylinders in each pair being spaced apart by providing one of them with annular ribs 33 formed by rolling. The engagement of the upper ends of these spacers with rod 24 serves to keep the side walls of the filter stretched vertically.

Another feature of this invention is that the filter element can be shaken easily in an effective manner to separate dust particles from it periodically. For this purpose a horizontal arm 35 extends through the side wall of the filter opposite to its inlet. The arm is substantially parallel to rod 24 above it. The opening 36 through which the arm extends is considerably larger than the arm to permit the arm to be moved laterally in it. The arm extends through a flexible mounting 37 of a well-known construction which is sealed in a flange 38 surrounding the drum opening. A rubber gasket 39 is mounted on the arm between the flexible mounting and a collar 41 rigidly mounted on the arm. The collar is drawn up tight against the gasket by a nut 42 threaded on the outer end of the arm and bearing against a sleeve 43 that engages the outer end of the mounting.

The outer end of arm 35 can be swung back and forth by an upright lever 45 which has an opening in its lower end that receives sleeve 43. A little ways above the arm the lever is pivotally mounted on a pin 46 that is supported by a bracket 47 projecting from the side of the drum. The upper end of the lever serves as a handle to swing it back and forth. Movement of the lever is limited by a stop 48 attached to its inner face and extending up into a bracket 49 on the drum. The stop will strike the end walls of the bracket if the lever is swung too far.

The inner end of the arm supports a post 51 that extends a short distance up into the center of the filter element. To reduce abrasion of the filter, a rubber sleeve 52 is mounted on the post. When the lever is swung, the inner end of the arm and the post likewise are swung back and forth and this causes the filter element to be rocked on the supporting rod like a pendulum to shake dust from it. The various concentric side walls 19 of the filter are swung towards and away from each other by this movement, which increases the agitation of the filter walls.

The bottom of each drum is provided with a clean-out opening, such as shown at 55 in Fig. 4, that normally is closed by a closure 56 which engages a circular seal 57 fastened to the bottom of the drum around the opening. The closure is mounted on and held in place by a cross bar 58 beneath it. The center of the closure is somewhat loosely connected to the center of the bar by means of a pin 59, encircled between the bar and closure by a washer 60, so that the closure can adjust itself and seal the clean-out opening. One end of the bar is mounted on a horizontal pivot pin 61 in bracket 62 projecting from one side of the drum. The opposite end of the bar projects from the opposite side of the drum and is pivotally connected by an adjustable link 63 to the upper part of a lever 64, the lower end of which is mounted on a pivot pin 66 in a bracket 67 projecting from the drum. When the upper end of the lever is against the drum, the vertical center line of the link is between pivot pin 66 and the drum so that the lever will stay up. When the lever is swung out away from the drum, it allows the cross bar and closure to swing down away from the clean-out opening as indicated in broken lines in Fig. 4. Pin 59 and washer 60 form a flexible joint in the nature of a centrally located ball joint, so that the pressure of cross bar 68 against the closure is all applied at substantially the center of the closure. The closure therefore will rock about its center, when necessary, to engage seal 57 with substantially uniform pressure.

The filter unit in this apparatus can be removed from the filtering drum by first removing cover 18 and then simply lifting rod 24 out of the drum after the outlet grommet 29 has been slipped off outlet pipe 13.

According to the provisions of the patent statutes I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Filtering apparatus comprising an upright drum, a plurality of spaced concentric rings each in a horizontal plane in the upper part of the drum, a downwardly tapered filter bag in the drum having its larger end encircling the rings and sealed to the drum, the bag being telescoped up and down within itself between upper and lower folds to provide concentric filtering walls hanging down around and between the rings, the rings being disposed beneath said upper folds and supporting said walls, spacing members engaging the inner surface of the bag between said walls, a rod extending across the drum above the rings and supported by the drum, and means suspending the rings from the rod, the lower part of the drum being provided with an air inlet and the upper part of the drum being provided with an air outlet.

2. Filtering apparatus according to claim 1, in which said spacing members consist of pairs of concentric perforated cylinders, wherein one cylinder in each pair is provided with laterally projecting means spacing the other cylinder in that pair from the first cylinder.

3. Filtering apparatus according to claim 1, in which there is means suspending the smaller end of the bag from the center of said rod.

4. Filtering apparatus according to claim 1, in which the larger end of the bag extends above said rod and is provided with diametrically opposite holes through which the ends of the rod extend, and projections on the inside of the drum supporting said rod ends.

5. Filtering apparatus according to claim 1, in which the larger end of the bag extends above said rod and is provided with diametrically opposite holes through which the ends of the rod extend, an outwardly extending gasket is secured to the top of the bag, and the drum is provided with a removable cover that clamps the gasket against the top of the side of the drum.

6. Filtering apparatus according to claim 1, in which said suspending means are loosely mounted on said rod.

7. Filtering apparatus according to claim 1, in which said suspending means are loosely mounted on said rod and clamp short lengths of said upper folds around said rings.

8. Filtering apparatus according to claim 1, in which said suspending means are clips provided with openings loosely receiving said rod and having their lower ends clamped against areas of the filter bag folded around said rings.

9. Filtering apparatus according to claim 8, in which each of said clips includes a pair of vertical strips disposed face-to-face and having openings in their upper portions receiving said rod, the lower portions of said pair of strips being bowed away from each other to receive between them one of said rings and the bag fold covering it, and a sleeve slidably mounted on each pair of strips between the rod and their bowed lower portions to clamp said portions against the bag.

10. Filtering apparatus comprising an upright drum, a plurality of spaced concentric rings each in a horizontal plane in the upper part of the drum, a downwardly tapered filter bag in the drum having its larger end encircling the rings and sealed to the drum, the bag being telescoped up and down within itself between upper and lower folds to provide concentric filtering walls hanging down around and between the rings, the rings being disposed beneath said upper folds and supporting said walls, spacing members engaging the inner surface of the bag between said walls, a rod extending across the drum above the rings and supported by the drum, means suspending the rings from the rod, the lower part of the drum being provided with an air inlet and the upper part of the drum being provided with an air outlet, an arm extending from below the folded bag through the side of the drum, a flexible seal connecting the arm with the drum, means connected with the outer end of the arm for swinging it laterally, and means mounted on the inner part of the arm and extending upward for agitating said walls when the arm is swung, whereby to shake dust from the walls.

11. Filtering apparatus according to claim 10, in which said last-mentioned means is encircled by the innermost filtering wall.

12. Filtering apparatus according to claim 10, in which the means connected to the outer end of said arm include an upright lever pivotally connected to the side of the drum and having its lower end flexibly connected to the outer end of the arm.

13. Filtering apparatus according to claim 10, in which said arm is substantially parallel to said rod.

14. Filtering apparatus according to claim 1, including a second upright drum provided with a tangential air inlet and with an air outlet near its top above said inlet in the other drum, said drums being disposed near each other, vertical walls connecting the two drums on opposite sides of said last-mentioned outlet and inlet to form a vertical passage connecting them, and means closing the upper and lower ends of the passage.

15. Filtering apparatus according to claim 1, including a clean-out opening in the bottom of the drum, a closure for the opening below it, a cross bar beneath the closure, means flexibly connecting the center of the closure to the bar, means pivotally supporting one end of the bar at one side of the drum, and means normally holding the opposite ends of the bar in an upper position to hold the closure against said opening, said last-mentioned means being releasable to permit the closure to be lowered away from the clean-out opening.

References Cited in the file of this patent

UNITED STATES PATENTS

| | | |
|---|---|---|
| 898,426 | Benedict | Sept. 15, 1908 |
| 918,895 | Noe | Apr. 20, 1909 |
| 959,936 | Hill | May 31, 1910 |
| 971,013 | Smith | Sept. 20, 1910 |
| 971,215 | Rakestraw | Sept. 27, 1910 |
| 1,856,133 | McClatchie | May 3, 1932 |
| 1,886,215 | Newman | Nov. 1, 1932 |